(12) United States Patent
Balamane et al.

(10) Patent No.: US 7,765,677 B2
(45) Date of Patent: Aug. 3, 2010

(54) METHOD FOR MANUFACTURING A MAGNETIC WRITE HEAD USING A PROTECTIVE LAYER TO PREVENT WRITE POLE CONSUMPTION

(75) Inventors: Hamid Balamane, Palo Alto, CA (US); Yvette Chung Nga Winton, San Francisco, CA (US); Yi Zheng, San Ramon, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 773 days.

(21) Appl. No.: 11/407,320

(22) Filed: Apr. 18, 2006

(65) Prior Publication Data

US 2007/0242389 A1    Oct. 18, 2007

(51) Int. Cl.
*G11B 5/193* (2006.01)
(52) U.S. Cl. .............. 29/603.13; 29/603.14; 29/603.23; 360/125.17; 360/125.41
(58) Field of Classification Search .............. 29/603.12, 29/603.13, 603.14, 603.23, 603.24, 603.25; 360/125.17, 125.41, 125.54, 125.65, 126
See application file for complete search history.

(56) References Cited

U.S. PATENT DOCUMENTS

| | | | |
|---|---|---|---|
| 6,104,576 A * | 8/2000 | Santini | 360/125.65 |
| 6,338,939 B1 * | 1/2002 | Clarke et al. | 29/603.14 X |
| 6,603,641 B1 * | 8/2003 | Sasaki | 29/603.24 X |
| 6,785,953 B2 | 9/2004 | Santini | 29/603.14 |
| 6,848,166 B2 | 2/2005 | Lee | 29/602.12 |
| 2002/0191350 A1 | 12/2002 | Emilio Santini | 360/317 |
| 2003/0133231 A1 * | 7/2003 | Nikitin et al. | 360/126 |
| 2004/0212924 A1 | 10/2004 | Lee | 360/126 |
| 2005/0024779 A1 | 2/2005 | Le et al. | 360/317 |

FOREIGN PATENT DOCUMENTS

JP         2000030217 A   *  1/2000

* cited by examiner

*Primary Examiner*—A. Dexter Tugbang
(74) *Attorney, Agent, or Firm*—Zilka-Kotab, PC (57) ABSTRACT

A method of manufacturing a write pole that prevents P2 pedestal consumption during ion milling removal of coil and pole seed layers. The write head can be constructed by forming a first pole and then forming a magnetic pedestal (P2) over the first pole. A protective layer of, for example, alumina is deposited over a portion of the pedestal in the pole tip region, leaving a portion of the pedestal uncovered in the flare region. A coil seed layer can then be deposited and a coil formed. When the coil seed layer is removed, such as by ion milling, the pole tip region of the pedestal is protected from the ion milling by the protective layer. Similarly, a top pole can be deposited by first depositing an electrically conductive, magnetic seed layer and then plating the top pole. When the top pole seed layer is removed by ion milling, the pole tip region of the pedestal is protected from removal by the protective layer.

9 Claims, 9 Drawing Sheets

METHOD FOR MANUFACTURING A MAGNETIC WRITE HEAD USING A PROTECTIVE LAYER TO PREVENT WRITE POLE CONSUMPTION

FIELD OF THE INVENTION

The present invention relates to magnetic recording and more particularly to a method for manufacturing a magnetic write head that avoids writer pole thickness (P2t) consumption during manufacture.

BACKGROUND OF THE INVENTION

The heart of a computer's long term memory is an assembly that is referred to as a magnetic disk drive. The magnetic disk drive includes a rotating magnetic disk, write and read heads that are suspended by a suspension arm adjacent to a surface of the rotating magnetic disk and an actuator that swings the suspension arm to place the read and write heads over selected circular tracks on the rotating disk. The read and write heads are directly located on a slider that has an air bearing surface (ABS). The suspension arm biases the slider toward the surface of the disk, and when the disk rotates, air adjacent to the disk moves along with the surface of the disk. The slider flies over the surface of the disk on a cushion of this moving air. When the slider rides on the air bearing, the write and read heads are employed for writing magnetic transitions to and reading magnetic transitions from the rotating disk. The read and write heads are connected to processing circuitry that operates according to a computer program to implement the writing and reading functions.

The write head traditionally includes a coil layer embedded in an insulation stack, the insulation stack being sandwiched between first and second pole piece layers. A gap is formed between the first and second pole piece layers by a gap layer at an air bearing surface (ABS) of the write head and the pole piece layers are connected at a back gap. Current conducted to the coil layer induces a magnetic flux in the pole pieces which causes a magnetic field to fringe out at a write gap at the ABS for the purpose of writing the aforementioned magnetic transitions in tracks on the moving media, such as in circular tracks on the aforementioned rotating disk.

In read head designs a spin valve sensor, also referred to as a giant magnetoresistive (GMR) sensor, has been employed for sensing magnetic fields from the rotating magnetic disk. The sensor includes a nonmagnetic conductive layer, hereinafter referred to as a spacer layer, sandwiched between first and second ferromagnetic layers, hereinafter referred to as a pinned layer and a free layer. First and second leads are connected to the spin valve sensor for conducting a sense current therethrough. The magnetization of the pinned layer is pinned perpendicular to the air bearing surface (ABS) and the magnetic moment of the free layer is located parallel to the ABS, but free to rotate in response to external magnetic fields. The magnetization of the pinned layer is typically pinned by exchange coupling with an antiferromagnetic layer.

The thickness of the spacer layer is chosen to be less than the mean free path of conduction electrons through the sensor. With this arrangement, a portion of the conduction electrons is scattered by the interfaces of the spacer layer with each of the pinned and free layers. When the magnetizations of the pinned and free layers are parallel with respect to one another, scattering is minimal and when the magnetizations of the pinned and free layer are antiparallel, scattering is maximized. Changes in scattering alter the resistance of the spin valve sensor in proportion to $\cos \Theta$, where $\Theta$ is the angle between the magnetizations of the pinned and free layers. In a read mode the resistance of the spin valve sensor changes proportionally to the magnitudes of the magnetic fields from the rotating disk. When a sense current is conducted through the spin valve sensor, resistance changes cause potential changes that are detected and processed as playback signals.

The spin valve sensor is located between first and second nonmagnetic electrically insulating read gap layers and the first and second read gap layers are located between ferromagnetic first and second shield layers. In a merged magnetic head a single ferromagnetic layer functions as the second shield layer of the read head and as the first pole piece layer of the write head. In a piggyback head the second shield layer and the first pole piece layer are separate layers.

In order to meet the ever increasing demand for improved data rate and data capacity, magnetic write heads have been constructed ever smaller. Write pole width reduction is one of the many on-going challenges in the magnetic head industry. On the one hand, deep ultra violet (DUV) photolithography processes for imaging and plating a P2 pedestal have allowed engineers to image smaller P2 pedestals, on the other hand, it provides a smaller depth of focus. As a result DUV photolithography provides less of a straight zone for the P2 pedestal.

Due to this photolithography limitation, P2 thickness (P2T) must be reduced at plating accordingly. After shaping P2 by ion mill trimming, P2T is reduced by 1.5 to 1.6 um. In a stitched pole design, aggressive ion milling processes, used to remove the coil seed layer, P3 seed layer and Cu stud seed layer, further consume P2T by 0.3 to 0.4 um. The final P2T could be only as high as 1.2 um which barely meets the P2 thickness requirement for the current devices.

In general, a long ion milling trim will degrade pole width (P2B) uniformity. A small photo patterned pole width is always preferred. This requires thinning down photo resist to improve resolution so that a small pole can be resolved without degrading in P2B variation. However, due to the current photolithography process limitations and the material removal caused by the previously discussed seed layer removal processes such as ion milling that aggressively consume P2T, further reduction in the as-plated P2T is not possible. The thickness of the photoresist can only be reduced if the consumption in P2T can also be reduced further down the line. Once the photoresist thickness is decreased, engineers can image smaller P2B and thus reduce the P2B sigma and the shape and variation within a wafer.

SUMMARY OF THE INVENTION

The present invention provides a method for manufacturing a magnetic write head that prevents the P2T consumption during seed layer removal. The invention includes forming a magnetic pedestal over a first or bottom magnetic pole. A protective layer is formed over a portion of the pedestal so that a portion of the pedestal remains uncovered.

The write pole may be formed with a pole tip region and a flared region, the pole tip region and the flare region meeting at a flare point. The pole tip region can extend to and beyond a location where an air bearing surface will be formed.

The protective layer can be constructed of alumina and can cover an area from a location near the flare point to a point beyond the ABS. An electrically conductive coil can be formed by first depositing an electrically conductive seed layer, and then patterning and electroplating a coil onto the seed layer. An ion mill process can be used to remove portions of the seed layer that are not covered by the coil. The protective layer over the P2 pedestal prevents P2 material from being removed during the ion milling process. Similarly, a top magnetic pole can be formed by a process that includes depositing a seed layer, electroplating the top pole and then performing an ion mill to remove unwanted portions of the seed layer. The protective layer over the P2 pedestal protects the pedestal from being consumed during this ion mill as well.

The present invention advantageously reduces P2T consumption by 0.3 to 0.4 um. These and other features and advantages of the invention will be apparent upon reading of the following detailed description of preferred embodiments taken in conjunction with the Figures in which like reference numerals indicate like elements throughout.

BRIEF DESCRIPTION OF THE DRAWINGS

For a fuller understanding of the nature and advantages of this invention, as well as the preferred mode of use, reference should be made to the following detailed description read in conjunction with the accompanying drawings which are not to scale.

DETAILED DESCRIPTION OF THE PREFERRED EMBODIMENTS

The following description is of the best embodiments presently contemplated for carrying out this invention. This description is made for the purpose of illustrating the general principles of this invention and is not meant to limit the inventive concepts claimed herein.

Figure 1:
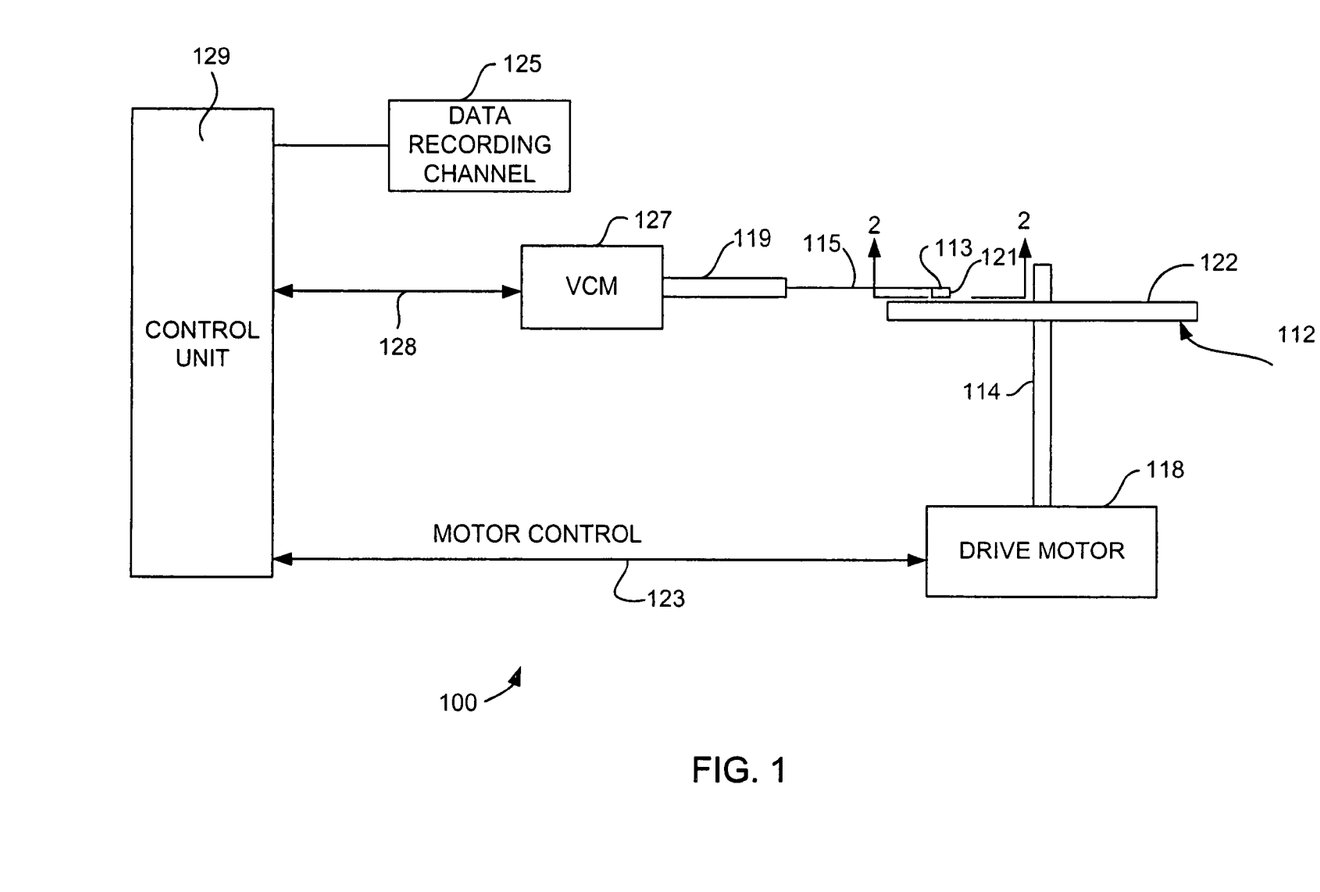
FIG. 1 is a schematic illustration of a disk drive system in which the invention might be embodied.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of annular patterns of concentric data tracks (not shown) on the magnetic disk 112.

At least one slider 113 is positioned near the magnetic disk 112, each slider 113 supporting one or more magnetic head assemblies 221. As the magnetic disk rotates, slider 113 moves radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

Figure 2:
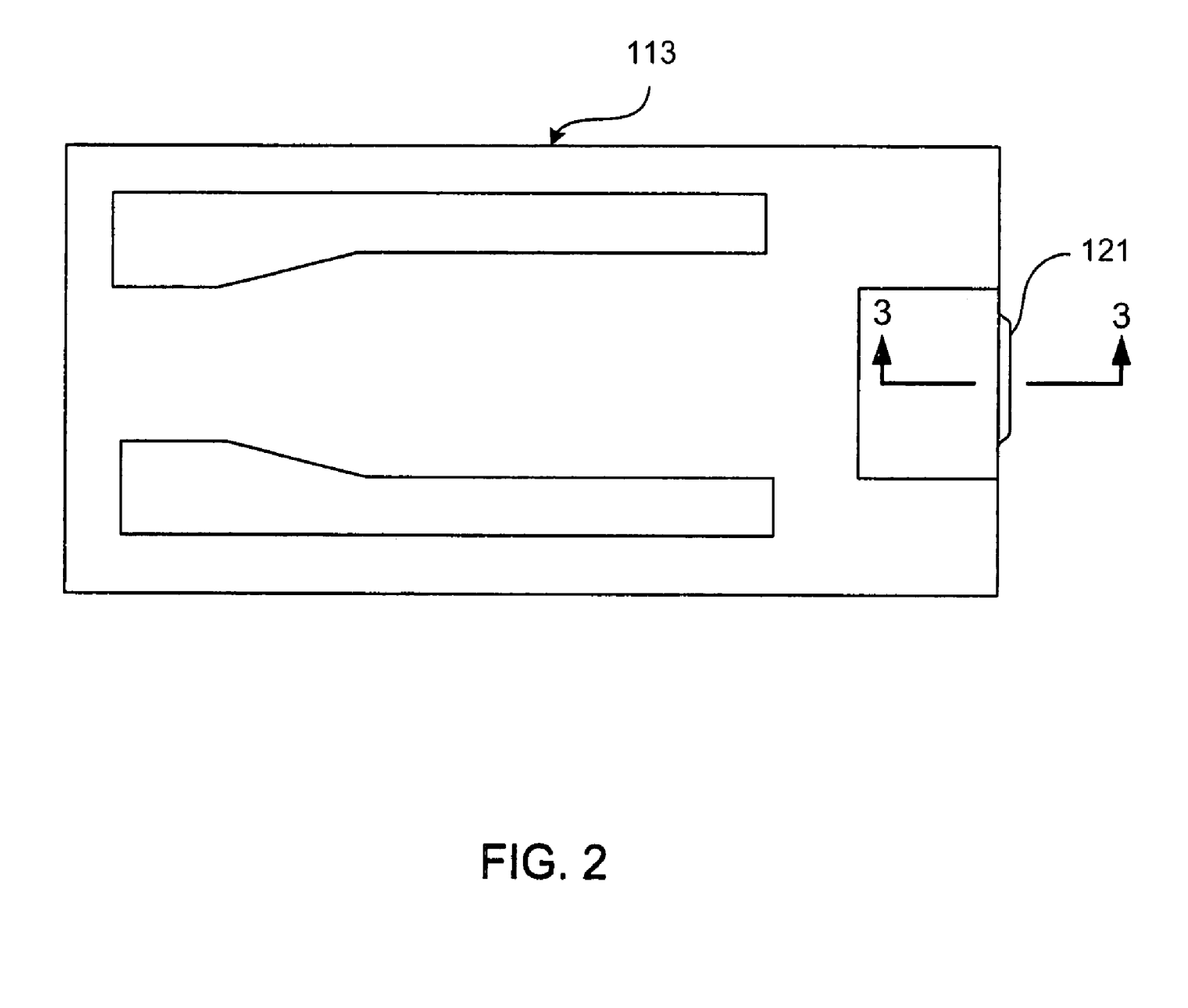
FIG. 2 is an ABS view of a slider, taken from line 2-2 of FIG. 1, illustrating the location of a magnetic head thereon.

With reference to FIG. 2, the orientation of the magnetic head 121 in a slider 113 can be seen in more detail. FIG. 2 is an ABS view of the slider 113, and as can be seen the magnetic head including an inductive write head and a read sensor, is located at a trailing edge of the slider. The above description of a typical magnetic disk storage system, and the accompanying illustration of FIG. 1 are for representation purposes only. It should be apparent that disk storage systems may contain a large number of disks and actuators, and each actuator may support a number of sliders.

Figure 3:
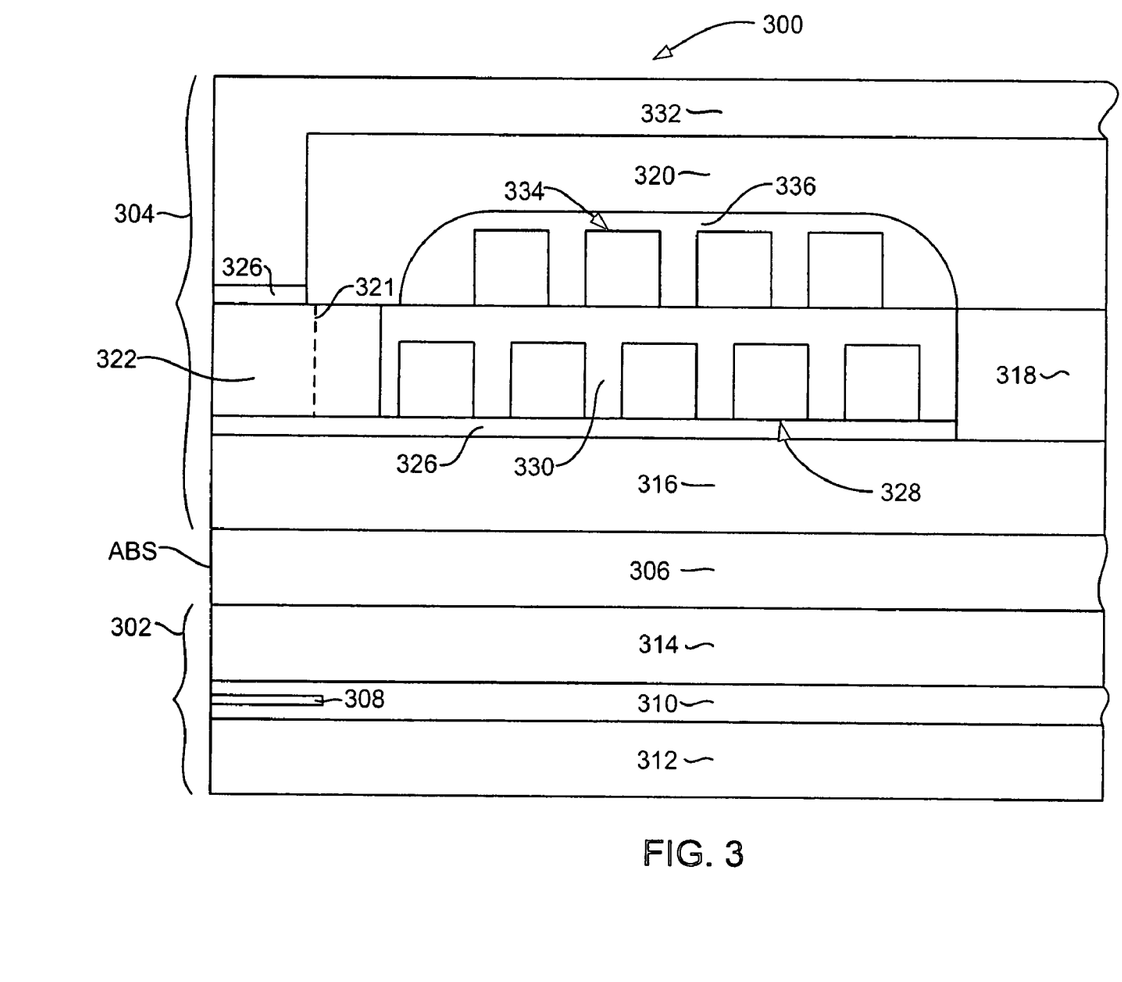
FIG. 3 is a cross sectional view, taken from line 3-3 of FIG. 2 and rotated 90 degrees counterclockwise, of a magnetic head according to an embodiment of the present invention.

With reference now to FIG. 3, a magnetic head 300 according to an embodiment of the present invention includes a read head 302 and a write head 304. The read head 302 and write head 304 may be separated from one another by a non-magnetic gap layer 306, which can be, for example, alumina. The read head 302 includes a magnetoresistive sensor 308, which may be a giant magnetoresistive sensor (GMR), tunnel valve, etc. The sensor 308 is embedded within a non-magnetic gap layer 310 such as alumina and is sandwiched between first and second magnetic shields 312, 314, which may be constructed of a magnetic material such as NiFe.

The write head 304 includes a bottom magnetic pole P1 316, having a pole tip end disposed near an air bearing surface (ABS) and a back end opposite the ABS. A magnetic back gap layer 318 is magnetically connected with the P1 pole at its back end. A magnetic top pole P3 320 is connected with the back gap layer 318 at its back end and is connected with a magnetic P2 pedestal layer 322 at its ABS end. The P2 pedestal layer 322 may be configured with a flare point 321, at which point P2 322 flares laterally outward (not seen in FIG. 3) in a flare region that extends from the flare point to the back edge of the P2 pole. The P2 322 has a pole tip region that generally extends from the flare point 321 to the ABS, and may have a substantially constant width in the pole tip region, this width defining a trackwidth of the write head 304.

A non-magnetic write gap layer 326 separates the P1 pole 316 from the P2 pedestal 322 in the pole tip region near the ABS. An electrically conductive first write coil 328 (shown partially and in cross section in FIG. 3) passes between the P1 and P3 poles 316, 320. The first coil 328 can be constructed of, for example, Cu and is embedded in a non-magnetic, electrically insulating layer 330, which may be alumina, hard baked photoresist or a combination of these or other materials. A protective layer 332, constructed of a hard, non-magnetic material such as alumina may be formed over the surface of the P3 pole 320 (the surface opposite the write gap layer 326) to protect the structure from damage such as by abrasion, corrosion, etc. The top pole P3 320 can be recessed from the ABS, and the non-magnetic protective layer 332 can extend between the P3 pole 320 and the ABS. A thinner protective layer 326 is formed over a portion of the P2 pedestal between the P3 pole and the ABS and may be constructed of, for example, alumina. The thin protective layer 326 could extend somewhat under the P3 pole 320, so long as the P3 pole 320 is able to make adequate contact with a sufficient area of the P2 pedestal 322 to provide sufficient flux flow to the P2 pedestal 322. Because the protective layers 326, 332 are constructed of the same material, they may not be distinguishable from one another by inspection, although they have been formed in separate manufacturing steps.

A second electrically conductive write coil 334 can be provided above the first coil 328. The second coil 334 is embedded in a second coil insulation layer 336, which can be constructed of, for example, hard baked photoresist, alumina or a combination of these or other materials. The first and second coils 328, 334 can be constructed by a damascene process or by a more conventional coil formation process that involves depositing a seed layer, forming a photoresist mask, plating the coil, removing the photoresist and removing the seed layer.

Whether the coils 328, 334 are formed by a damascene process or more conventional process, the process of manufacturing the coils 328, 334 requires removing an electrically conductive seed layer. This seed layer removal can be performed, for example, by a sputter etching process. Similarly, the process of depositing the P3 pole 320 requires the deposition of a seed layer (not shown) which must be later removed by ion milling. Similarly, a contact or Cu stud (not shown) must be included to provide a contact point for supplying electrical current to the coil 328. The formation of the Cu stud also requires the deposition of a seed layer that must be removed, such as by ion milling. The ion mill processes used to remove these seed layers are very aggressive and causes an unacceptably large amount of material removal from the P2 pedestal. As the size of the write head (and correspondingly, the size of the P2 pedestal) shrinks, the amount of material removed from the P2 pedestal during these aggressive ion mills becomes a much larger percentage of the overall P2 pedestal thickness, making such damage to the P2 pedestal 322 catastrophic to the proper performance of the write head 300. The present invention, including the protective layer 322, advantageously prevents this damage to the P2 pedestal 322.

Figure 4:
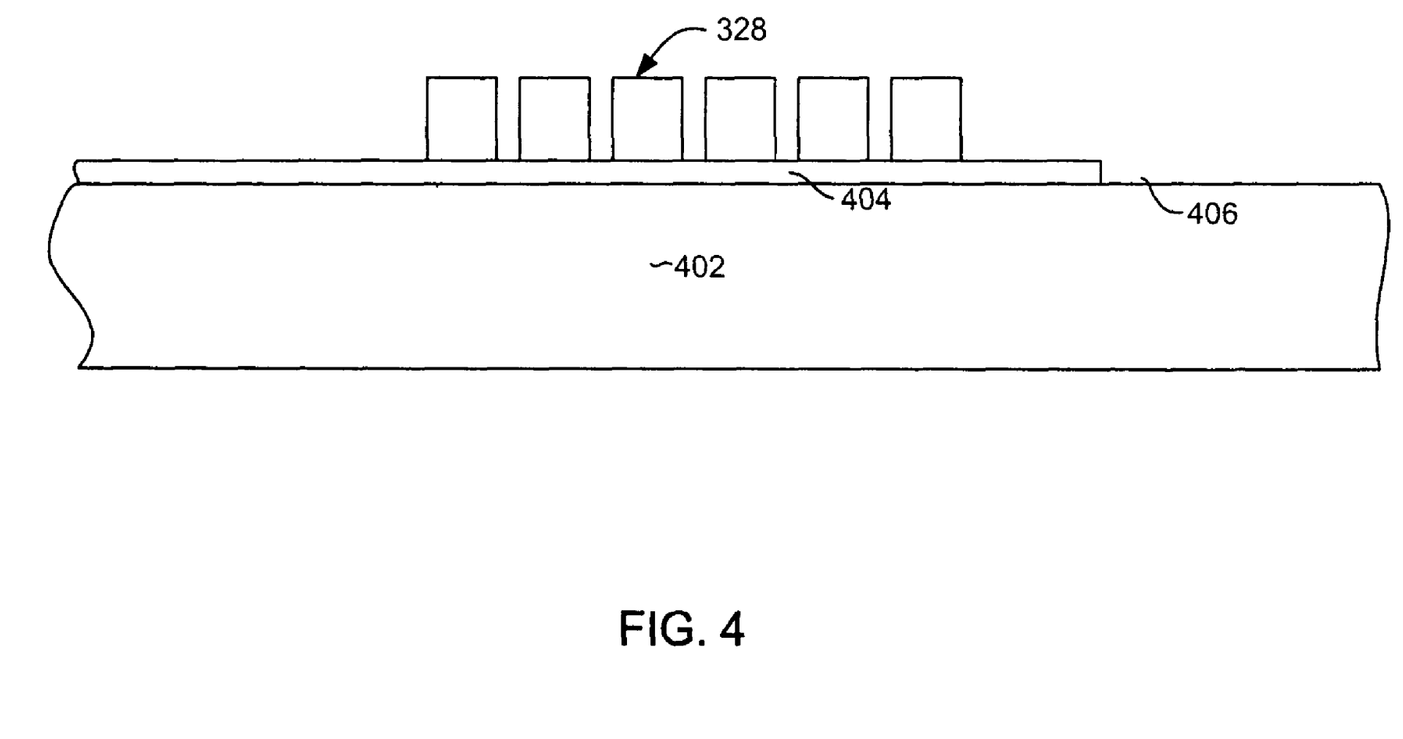
FIGS. 4-9 are views of a magnetic write head in various intermediate stages of manufacture, illustrating a method for manufacturing a write head according to an embodiment of the invention.

With reference now to FIGS. 4-16, a method for manufacturing a magnetic write head according to an embodiment of the invention is described. With particular reference to FIG. 4, a first magnetic pole structure 402 is formed. This pole structure 402 can be constructed of, for example NiFe, and can be deposited over a substrate such as alumina (not shown). A non-magnetic write gap layer 404 such as alumina silicon oxide or some other suitable material is deposited over the pole 402 and is formed to leave a back gap region 406 uncovered. This uncovered back gap portion can be formed by a subtractive process such as by depositing the write gap 404 full film and then masking and performing a reactive ion etch (RIE) to remove the material 404 from the back gap region 406. This back gap region 406 can also be formed by masking off the back gap area 406 prior to depositing the write gap layer 404. After the write gap layer has been formed, the first electrically conductive write coil 328 is formed. As mentioned above, this coil 328 can be constructed by a damascene process or a more traditional process, such as will be familiar to those skilled in the art.

Figure 5:
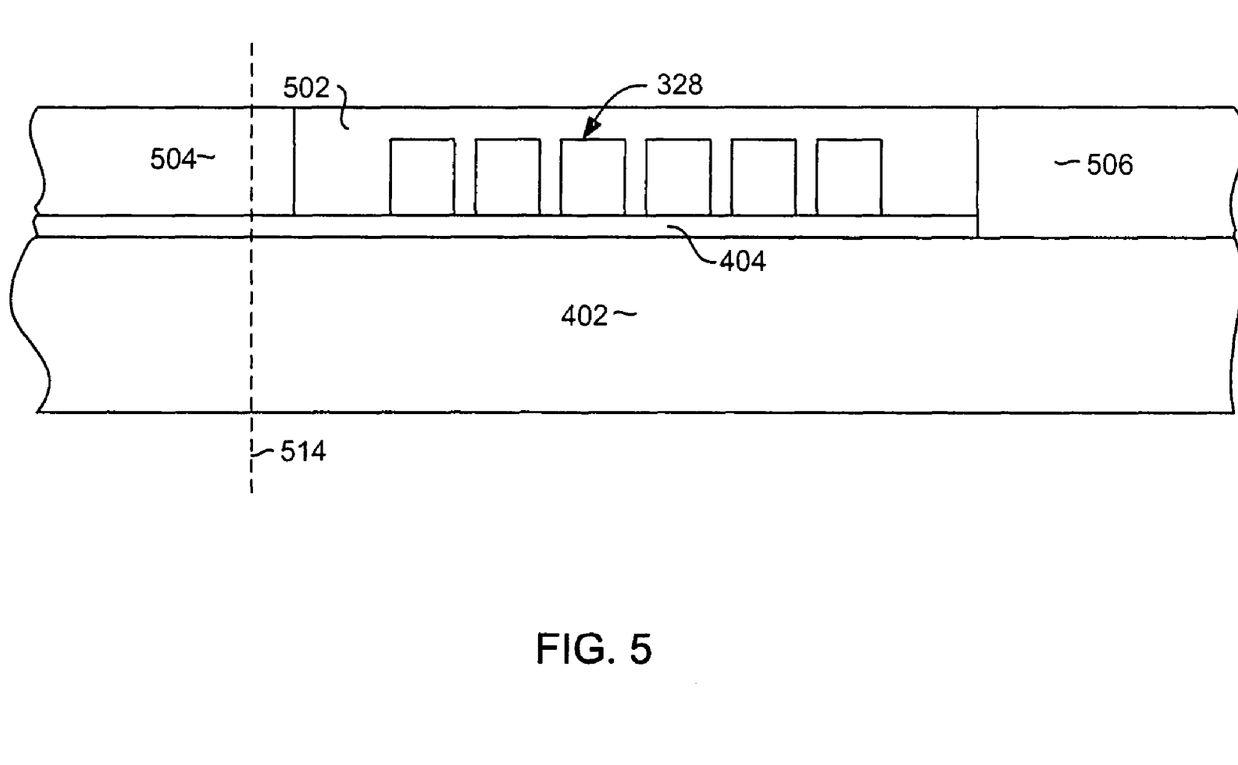

With reference to FIG. 5, a magnetic P2 pedestal 504 and a magnetic back gap 506 are formed. A non-magnetic fill layer 502 is deposited to fill the space between the P2 pedestal 504 and back gap 506. This fill layer can include alumina, hard baked photoresist or a combination of these or other materials. A chemical mechanical polish (CMP) can be performed to form a smooth, co-planar surface 508 across the pedestal 504, fill layer 502 and back gap 506, and to expose the P2 504 and back gap 506. The P2 pedestal 504 can be formed with a flare point at a location 514, where the P2 pedestal 504 flares laterally outward, which can not be seen in FIG. 5.

Figure 6:
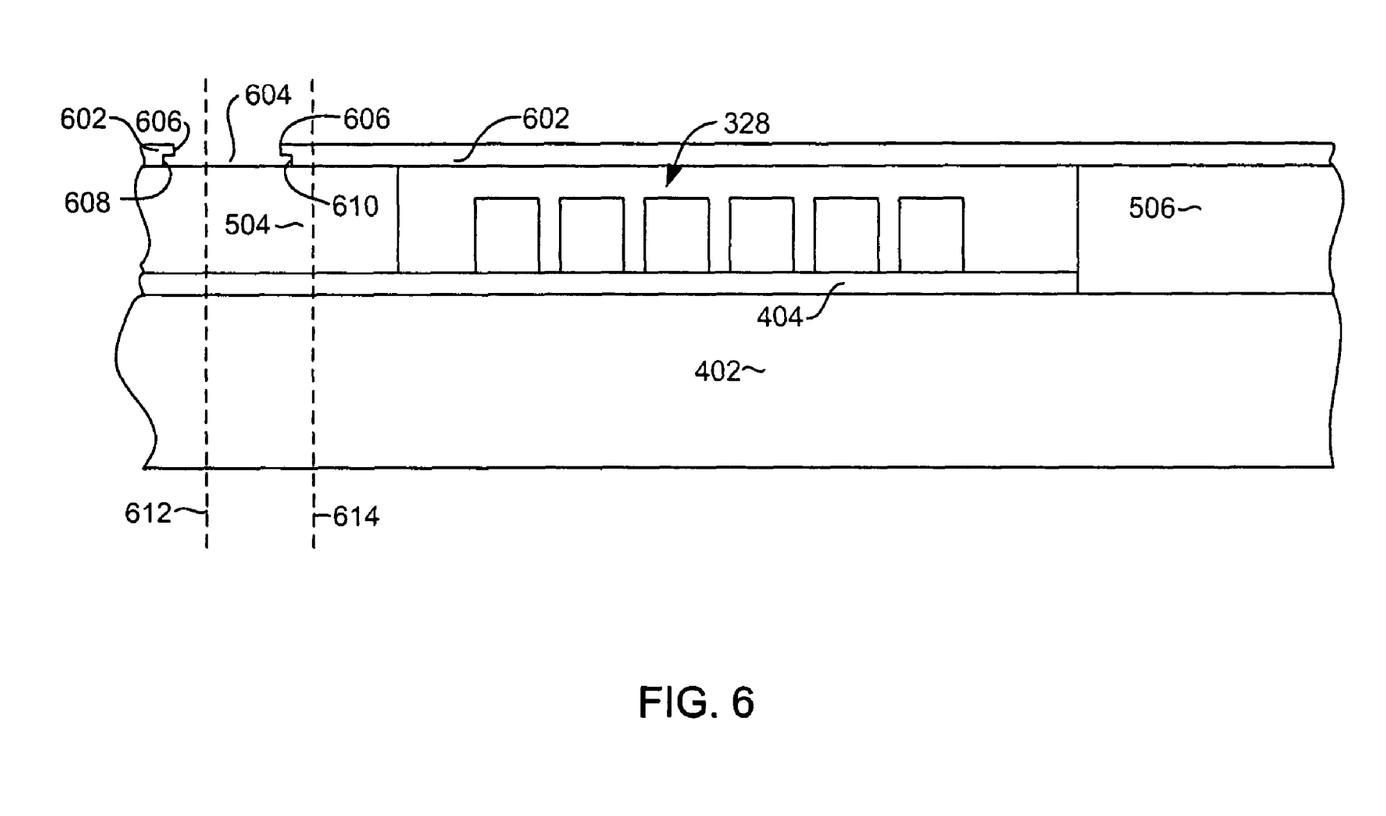

Then, with reference to FIG. 6, a mask structure 602 is formed having an opening 604 over a portion of the pedestal 504. The mask 602 can be formed by depositing a layer of photoresist and then photolithographically patterning and developing the photoresist. The mask 602 is preferably a bi-layer mask having overhanging portions 606 formed at the opening 604 in the mask 602. The opening 604 preferably has a front edge 608 disposed beyond (in front of) the location at which the ABS will be formed after lapping. This ABS location is denoted by line 612. The opening 604 also has a back edge 610 that is disposed near the location of the flare point, which is denoted by line 614. The back edge 610 is preferably disposed slightly in front of the flare point 614.

Figure 7:
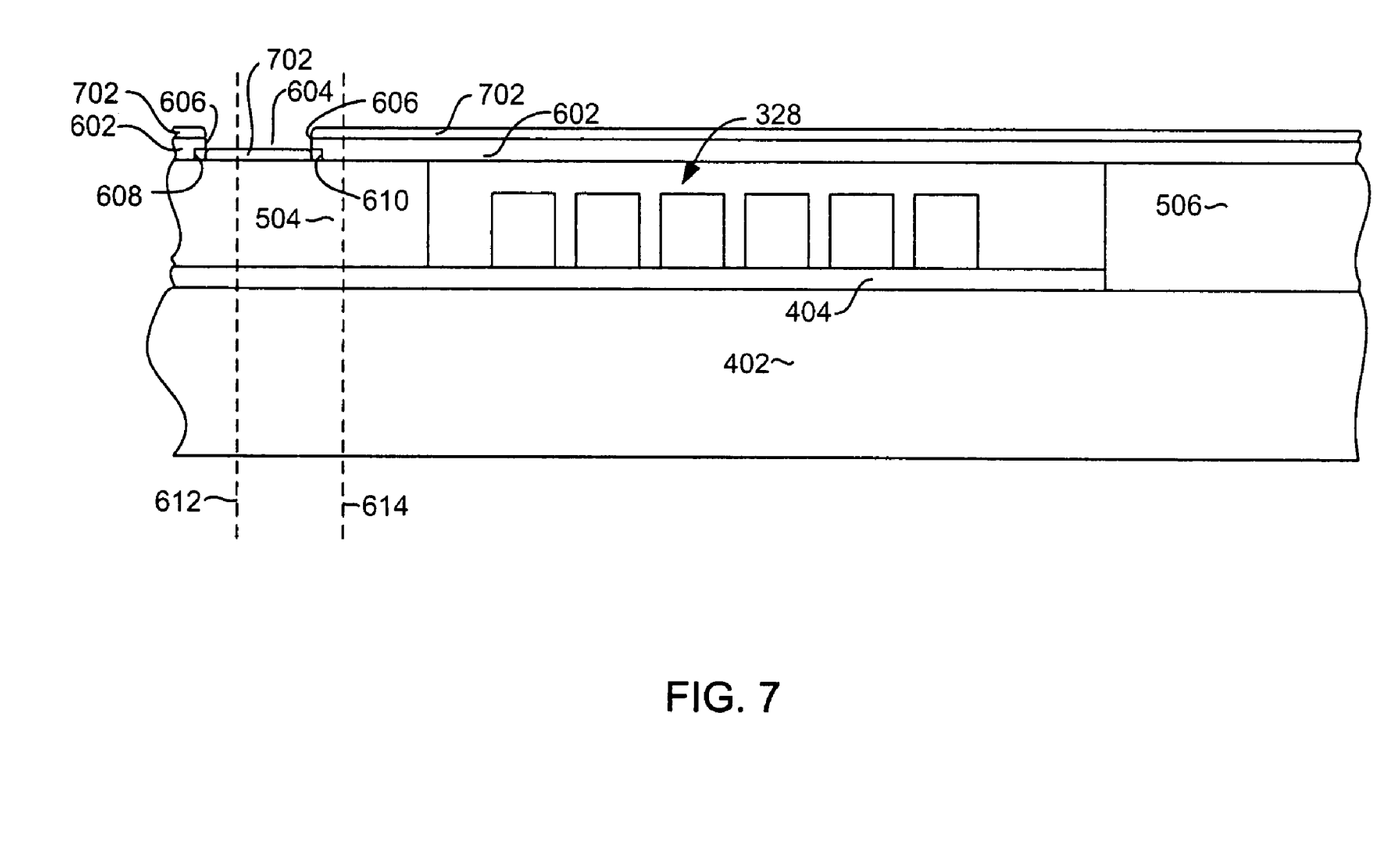
Figure 8:
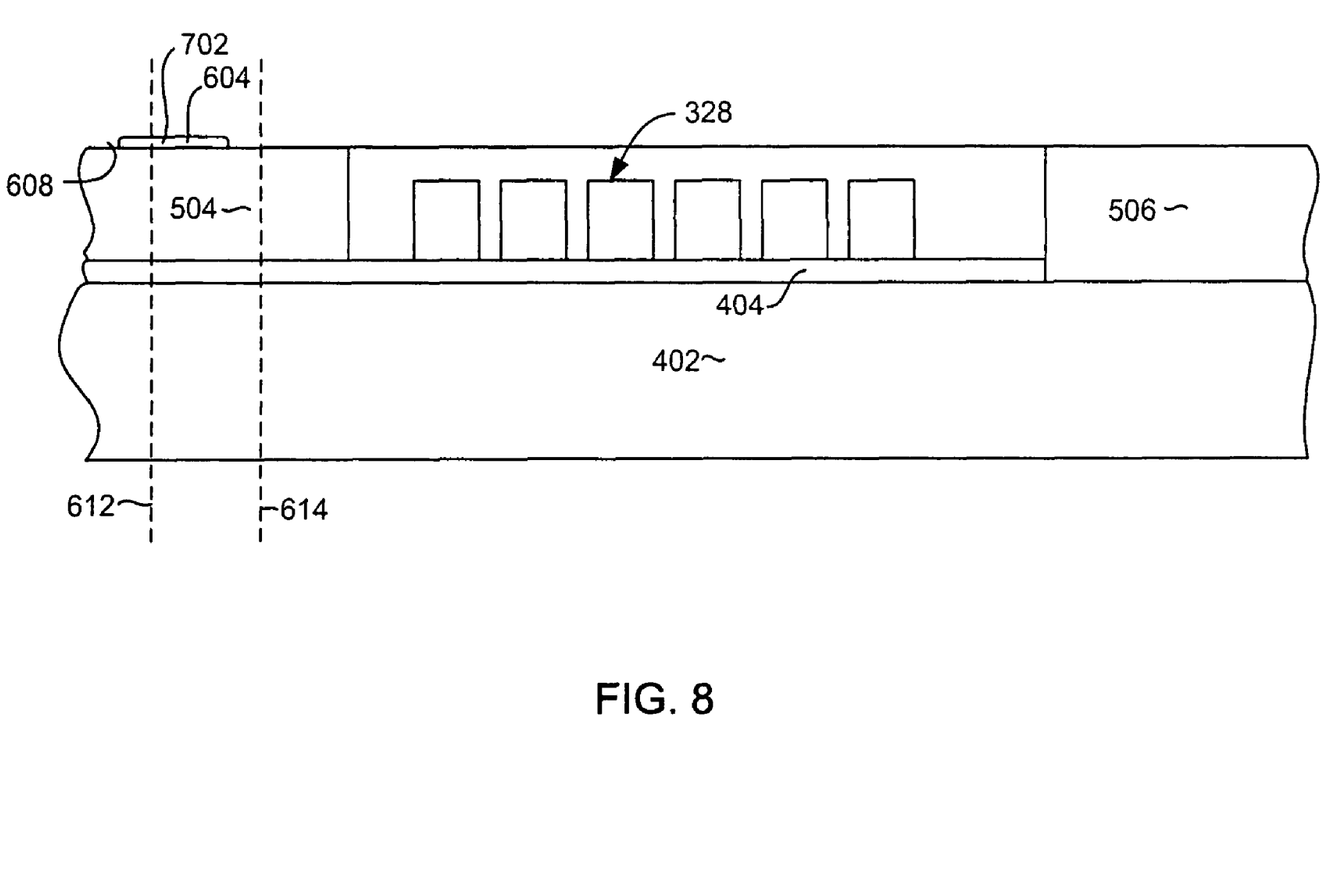

With reference to FIG. 7, a layer of hard, etch resistant protective material 702 is deposited. The layer 702 is preferably alumina, and, although other materials could be used, the layer 702 will be referred to as protective alumina layer 702. As can be seen, the alumina layer 702 is deposited into the opening 604 as well as on top of the mask 602. Then, the mask 602 is lifted off by a process such as a chemical lift off process, resulting in the structure shown in FIG. 8. The bi-layer structure of the mask 602 facilitates this chemical lift off, by preventing the deposited alumina layer 702 from completely closing off the mask 602.

Figure 9:
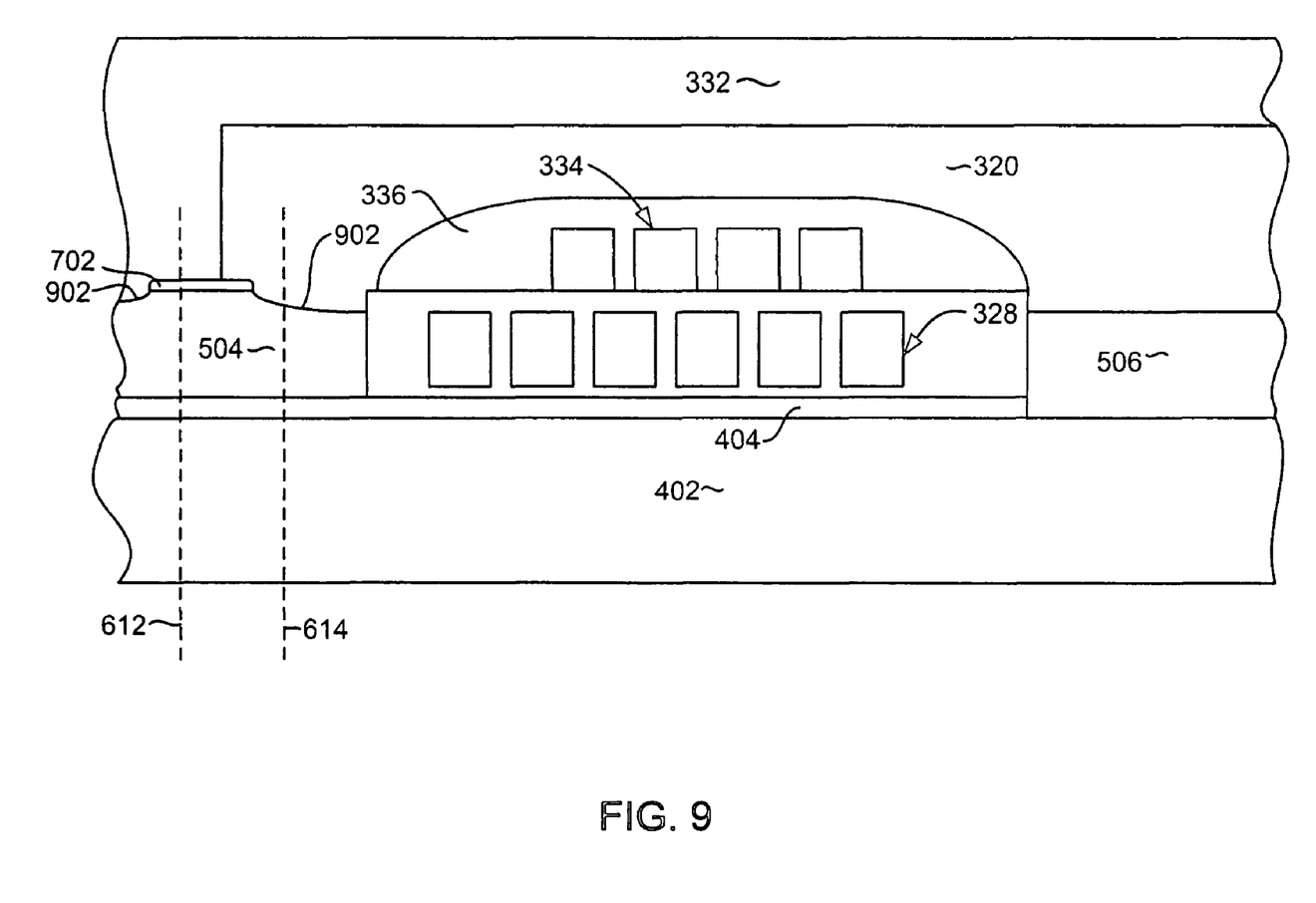

With reference now to 9, the second electrically conductive coil 334 is formed. The top magnetic pole P3 320 is formed over second coil 334 and is separated from the coil 334 by the coil insulation layer 336. As discussed previously, the second coil 334 and the P3 pole 320 are deposited by an electroplating process. These electroplating processes require that an electrically conductive seed layer be sputter deposited for each of the coil layer 334 and the P3 pole 320. Each of these seed layers must be removed after the coil 334 and P3 pole 320 have been formed. The removal of the seed layers requires the use of a material removal process such as ion milling or some similar process, which attacks the P2 pedestal 504 and back gap 506.

With reference still to FIG. 9, it can be seen that the seed removal processes used during construction of the coil 334 and P3 pole 320 remove material from portions of the P2 pedestal, resulting in downward sloping recesses 902 in the top of the P2 pedestal 504 in regions not protected by the alumina protective layer 702. However, in regions covered by this protective layer 702, no P2 material is removed by the seed removal processes. The material used to form the protective layer 702 (preferably alumina) is resistant to the material removal processes, such as reactive ion etching, used to remove the coil and P3 seed layers.

It can also be seen that the protective layer 702 initiates at a location somewhere between the flare point 614 and the location of an intended air bearing surface (ABS). Those skilled in the art will appreciate that the ABS has not yet been formed and will be later formed by a lapping process after the wafer on which the head 300 has been constructed has been sliced into rows. However, the line 612 indicated a location where the ABS will be located after such lapping process. It can be seen that the protective layer extends beyond this ABS location 612 so that P2 pole 504 in the region of the ABS is completely protected by the protective layer 702. The thickness (in the vertical direction in FIG. 9) of the P2 pedestal is an important parameter of write head performance. Therefore, preventing removal of P2 material in this ABS region ensures that optimal write head performance is maintained.

It is also necessary, however, that the P3 pole structure 320 be able to contact the P2 pedestal in a back region of the P2 pedestal away from the ABS (ie. in the flare region). Therefore, the protective layer 702 leaves the P2 pedestal uncovered in this back region so that the P3 pedestal can be plated to contact and magnetically connect with the P2 pedestal 504. After the top P3 pole 320 has been constructed, a protective alumina layer 332 can be deposited over the head.

In addition to protecting P2 504 from the coil 334 and P3 320 seed removal processes, the protective layer 702 also protects the P2 pedestal 504 from a seed layer removal process used in the process of constructing one or more electrically conductive studs (not shown). These studs, which are located outside of the view the figures, provide electrical contact with the coils 328, 334.

While various embodiments have been described, it should be understood that they have been presented by way of example only, and not limitation. Other embodiments falling within the scope of the invention may also become apparent to those skilled in the art. Thus, the breadth and scope of the invention should not be limited by any of the above-described exemplary embodiments, but should be defined only in accordance with the following claims and their equivalents.

What is claimed is:

1. A method of manufacturing a magnetic write head, the method comprising:
    forming a first magnetic pole (P1);
    forming a magnetic pedestal (P2) over the first magnetic pole (P1), the magnetic pedestal having a top surface opposite the first magnetic pole, a location of an intended ABS, a flare point and a pole tip region between the location of the intended ABS and the flare point;
    depositing a protective layer over the top surface of the magnetic pedestal (P2) in the pole tip region, the protective layer covering a portion of the top surface of the magnetic pedestal (P2) at the intended ABS, while leaving a portion of the top surface of the magnetic pedestal (P2) that is removed from the intended ABS uncovered; and
    leaving the protective layer to remain in the write head.

2. A method as in claim 1, further comprising after forming the first magnetic pole (P1), forming the magnetic pedestal (P2) and depositing the protective layer:
    depositing a coil seed layer;
    forming an electrically conductive coil;
    performing a material removal process to remove the coil seed layer, the pole tip region of the magnetic pedestal (P2) is protected from the material removal process by the protective layer.

3. A method as in claim 1, further comprising after forming the first magnetic pole (P1), forming the magnetic pedestal (P2) and depositing the protective layer:
    depositing a first electrically conductive seed layer;
    forming an electrically conductive coil;
    performing an ion mill to remove portions of the coil seed layer that are not covered by the first electrically conductive coil, the pole tip region of the magnetic pedestal (P2) being protected from the ion mill by the protective layer;
    depositing a second electrically conductive seed layer;
    forming a top magnetic pole (P3), the top magnetic pole (P3) being magnetically connected with the portion of the top surface of the magnetic pedestal (P2) that is not covered by the protective layer;
    performing a material removal process to remove portions of the second electrically conductive seed layer that are not covered by the top magnetic pole (P3), the pole tip region of the magnetic pedestal (P2) being protected from the ion mill by the protective layer.

4. A method as in claim 1, further comprising after depositing the protective layer:
    depositing an electrically conductive seed layer;
    forming an electrically conductive contact pad;
    performing a material removal process to remove the electrically conductive seed layer, the pole tip region of the P2 pedestal is protected from the material removal process by the protective layer.

5. A method as in claim 1 wherein the protective layer comprises alumina.

6. A method as in claim 1 wherein the protective layer comprises alumina and extends beyond the intended ABS in a first direction and extends to a point near the flare point in a second direction.

7. A method as in claim 1, wherein the magnetic pedestal (P2) has a flare region opposite the ABS, and wherein the protective layer leaves the flare region of the magnetic pedestal (P2) substantially uncovered.

8. A method as in claim 1 wherein depositing the protective layer further comprises:
    forming a bi-layer photoresist mask, the photoresist mask having an opening with a front edge located beyond the location of the intended ABS and a back edge located near the flare point;
    depositing alumina; and
    lifting off the photoresist mask.

9. A method as in claim 1 wherein the magnetic pedestal (P2) has a flare region opposite the intended ABS and the protective layer leaves the top surface of the magnetic pedestal (P2) substantially uncovered in the flare region, the method further comprising forming a top magnetic pole (P3) such that the top magnetic pole P3 contacts the top surface of the magnetic pedestal (P2) in the flare region.

* * * * *